(12) United States Patent
Kurokawa et al.

(10) Patent No.: US 6,453,052 B1
(45) Date of Patent: Sep. 17, 2002

(54) AUTOMATED METHOD AND IMAGE PROCESSING SYSTEM FOR HAIR STYLE SIMULATION

(75) Inventors: Masato Kurokawa, Yokohama; Kazunori Miyata, Tokyo-to, both of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/556,119

(22) Filed: Nov. 9, 1995

(30) Foreign Application Priority Data

Nov. 10, 1994 (JP) .............................................. 6-276316

(51) Int. Cl.[7] .................................................. G06K 9/00
(52) U.S. Cl. ............................ 382/100; 30/30; 345/632
(58) Field of Search ................................ 382/118, 289, 382/294, 296, 302; 395/135, 120; 345/632, 419, 420; 30/30

(56) References Cited

U.S. PATENT DOCUMENTS

| | | | | |
|---|---|---|---|---|
| 5,060,171 A | * | 10/1991 | Steir et al. | 364/518 |
| 5,375,195 A | * | 12/1994 | Johnston | 395/135 |
| 5,404,426 A | * | 4/1995 | Usami et al. | 395/135 |
| 5,537,662 A | * | 7/1996 | Sato et al. | 395/135 |
| 5,563,992 A | * | 10/1996 | Murata et al. | 395/135 |
| 5,568,599 A | * | 10/1996 | Yoshino et al. | 395/135 |
| 5,608,852 A | * | 3/1997 | Hashimoto et al. | 395/135 |
| 5,611,037 A | * | 3/1997 | Hayashi | 395/135 |

FOREIGN PATENT DOCUMENTS

WO 93 15475 * 8/1993 .................. 382/118

* cited by examiner

Primary Examiner—Jayanti K. Patel
(74) Attorney, Agent, or Firm—Richard A. Tomlin; Bracewell & Patterson, L.L.P.

(57) ABSTRACT

A method and image processing system are disclosed which simulate a hair style selected from among a number of prestored hair images in association with a facial image. The selected hair image includes an interior perimeter to be positioned adjacent to the facial image and a first plurality of associated feature points distributed along the interior perimeter of the hair image. A subset of the first plurality of feature points are disposed at locations at which the hair image is intended to abut, but not substantially overlap the facial image. The size and orientation of the selected hair image are automatically corrected with respect to the facial image. A second plurality of feature points distributed along the facial perimeter are then determined, which each correspond to one of the subset of feature points. One or more facial perimeter vectors are constructed by connecting neighboring feature points within the second plurality of feature points. Similarly, one or more hair perimeter vectors are constructed by connecting neighboring feature points within the subset of feature points. The hair image is automatically transformed by displaying each of a plurality of pixels within the hair image at a transformed location with respect to the facial perimeter vectors determined from an original position of the pixel with respect to the hair perimeter vectors. In response to the transformation of the hair image, the transformed hair image is displayed superimposed on the facial image.

24 Claims, 8 Drawing Sheets

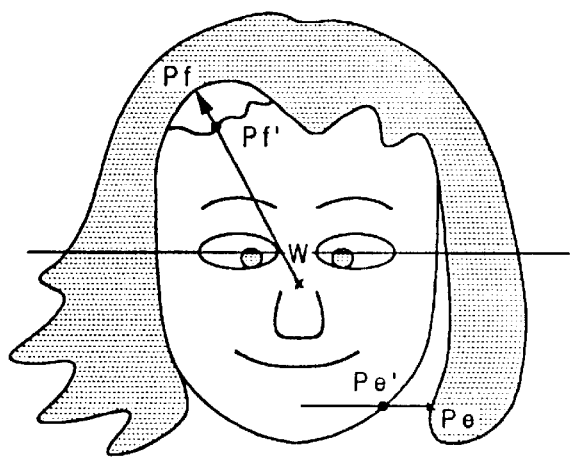
Fig. 12
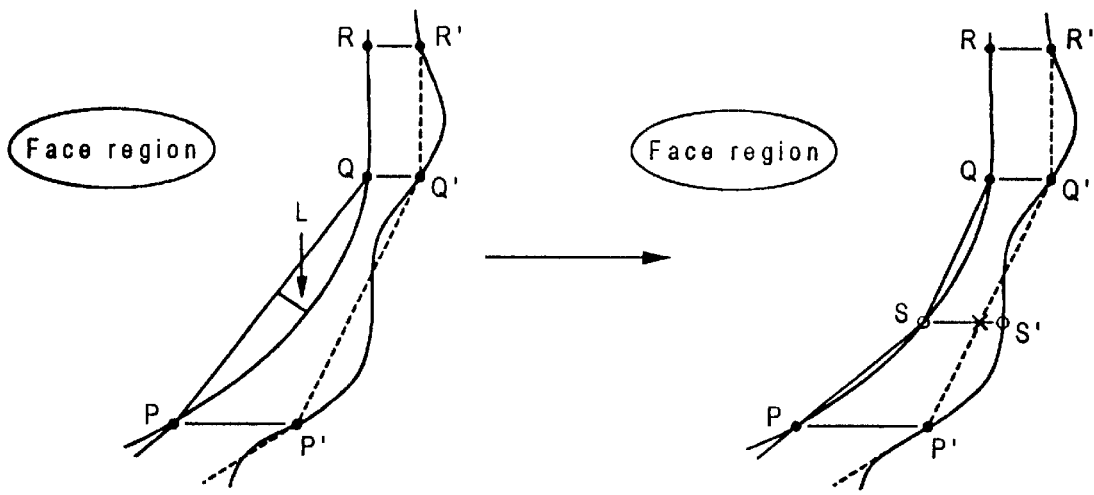
Fig. 13A                    Fig. 13B

AUTOMATED METHOD AND IMAGE PROCESSING SYSTEM FOR HAIR STYLE SIMULATION

BACKGROUND OF THE INVENTION

1. Technical Field

The present invention relates in general to a method and system for image processing and in particular to a method and system for simulating hair styles. Still more particularly, the present invention relates to a method and system for automatically fitting a hair image selected by a user to a facial image of the user.

2. Description of the Related Art

Usually, when people desire to get their hair styled, they specify a hair style at a hair salon or other beauty facility and request that a hair stylist to cut their hair in the desired style. However, some people want to verify whether various hair styles complement their facial features before the hair stylist starts to cut their hair. In such cases, a simulation of various hair styles is helpful.

Although a simulation system for hair styles is currently available, a user is required to manipulate the simulation system to fit various predetermined hair style images to an image of the customer's face. That is, an image of the customer's face and various hair styles are fitted to each other in accordance with the following steps: First, using photo retouch software, the user manually scales, rotates, and translates a hair image to align the hair image with an image of the customer's face. Then, utilizing a painting tool, the user finishes the simulation by filling in gaps around the face or neck and deleting hairs that overlap with the facial image. One example of fitting hair images to a facial image utilizing this manual operation is found in Japanese PUPA 62-161308.

Although the manual method for fitting hair images to facial images provides satisfactory results, particularly in the finishing of images, the time required to align and finish an image is between 20 and 30 minutes and is therefore inappropriate in view of the typical waiting time in a beauty shop. In practice, assuming that the waiting time in a beauty shop is about 10 minutes and that several hair styles may be simulated, the hair imaging simulation must be finished in about one minute per hair style. Thus, it should be apparent that even one hair style cannot be simulated by conventional hair style simulation systems during a typical waiting time in a beauty shop. Furthermore, the manual operations required in a conventional simulation system entail complicated manipulations of images and may therefore be difficult for some users to perform.

Another hair style simulation system is disclosed in Japanese PUPA 5-189542. In this simulation system a hair image is obtained by creating a 3-dimensional model of a hair style, performing a modification operation that accounts for the effects of external forces, such as wind and gravity, and finally rendering a picture of the hair style. However, this simulation system is ineffective due to the data volume required for modeling the hair style, the processing time required, and the lack of realism in the resulting images.

Consequently, it would be desirable to provide an improved method and system for simulating hair styles which automatically fit an image of a selected hair style to a facial image.

SUMMARY OF THE INVENTION

It is therefore one object of the present invention to provide an improved method and system for image processing.

It is another object of the present invention to provide an efficient method and system for simulating hair styles.

It is yet another object of the present invention to provide an easily operable hair style simulation system which automatically fits an The foregoing objects are achieved as is now described. A method and image processing system are disclosed which simulate a hair style selected from among a number of prestored hair images in association with a facial image. The selected hair image includes an interior perimeter to be positioned adjacent to the facial image and a first plurality of associated feature points distributed along the interior perimeter of the hair image. A subset of the first plurality of feature points are disposed at locations at which the hair image is intended to abut, but not substantially overlap the facial image. The size and orientation of the selected hair image are automatically corrected with respect to the facial image. A second plurality of feature points distributed along the facial perimeter are then determined, which each correspond to one of the subset of feature points. One or more facial perimeter vectors are constructed by connecting neighboring feature points within the second plurality of feature points. Similarly, one or more hair perimeter vectors are constructed by connecting neighboring feature points within the subset of feature points. The hair image is automatically transformed by displaying each of a plurality of pixels within the hair image at a transformed location with respect to the facial perimeter vectors determined from an original position of the pixel with respect to the hair perimeter vectors. In response to the transformation of the hair image, the transformed hair image is displayed superimposed on the facial image.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 12 depicts the translation of facial feature points according to the present invention; and FIGS. 13A and 13B depict the adaptive division of a reference vector according to the present invention.

DETAILED DESCRIPTION OF PREFERRED EMBODIMENT

Figure 1:
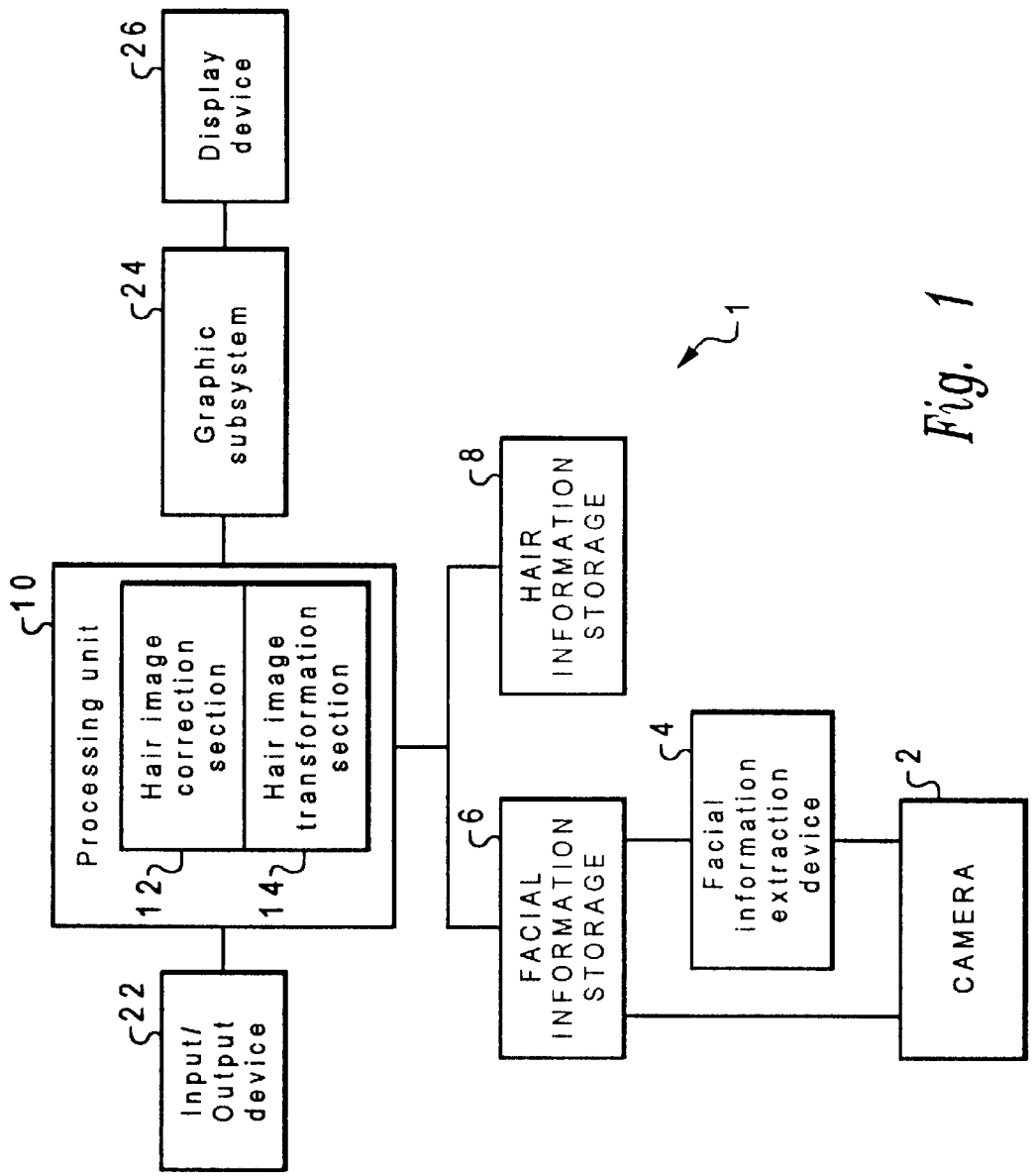
FIG. 1 is a block diagram illustrating a preferred embodiment of the configuration of the system of the present invention.

With reference now to the figures and in particular with reference to FIG. 1, a preferred embodiment of the configuration of the hair style simulation system of the present invention will be described. A user desirous of performing a hair style simulation takes a picture of his or her own face utilizing a camera 2. Camera 2 is connected to a facial information storage 6, which temporarily stores photographed facial images. Camera 2 is further connected to facial information extraction device 4, which extracts facial information from a facial image. Facial information extraction device 4 is also connected to facial information storage 6 in order to store extracted facial information. Hair style simulation system 1 includes hair information storage 8 for storing hair images to be selected by users and hair information to be used for transforming the hair images. Hair information storage 8 and facial information storage 6 are both connected to processing unit 10.

Processing unit 10 comprises a hair image correction section 12, which corrects the size, slant, and position of a selected hair image retrieved from hair information storage 8, and a hair image transformation section 14, which transforms the hair image (and hair information) into an appropriate shape after the processing of hair image correction section 12. Processing unit 10 is connected to an input/output (I/O) unit 22, which includes an input device for receiving input for the selection and processing of hair images and a printer for printing the results of a hair style simulation. A graphic subsystem 24 and a display device 26 for displaying the final result of a hair style simulation are also connected to processing unit 10.

Figure 2:
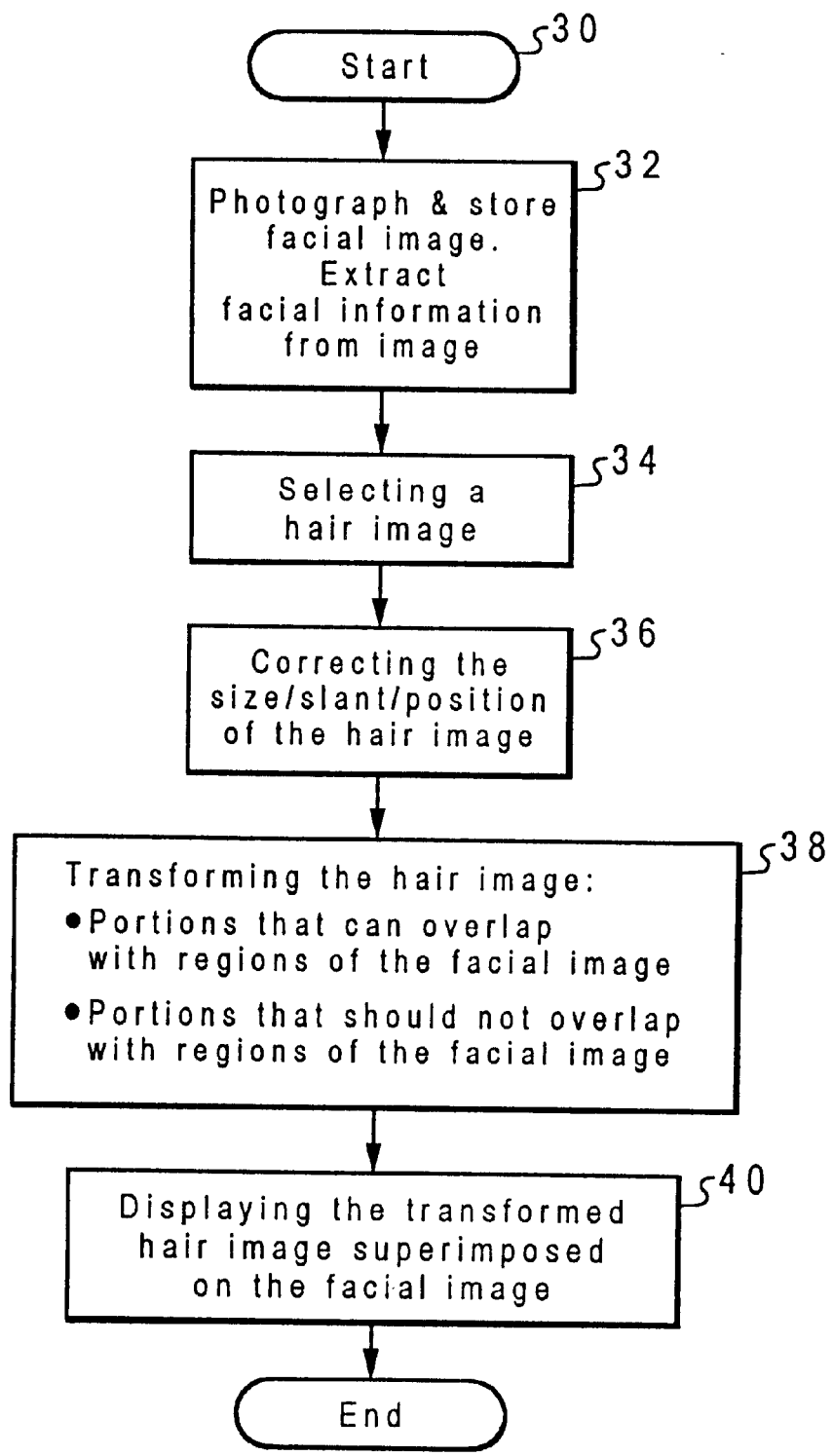
FIG. 2 is a high-level flowchart depicting a preferred embodiment of the method of the present invention.

Referring now to FIG. 2, there is depicted a flowchart of a preferred embodiment of the method employed by the present invention to simulate a hair style. As illustrated, the process begins at block 30 and thereafter proceeds to block 32, which illustrates facial images photographed by camera 2 being stored within facial information storage 6 and being transmitted to facial information extraction device 4 for the extraction of facial information. Like the facial image, the facial information extracted by facial information extraction device 4 is stored within facial information storage 6. Next, at block 34, hair images or the names of hair styles are displayed to the user within display device 26. The user selects from among the displayed names of hair styles or hair images utilizing I/O device 22. Following the selection of a hair style, hair image correction section 12 of processing unit 10 corrects the size, slant, and position of the selected hair image with reference to facial information and hair information, as depicted at block 36. The process then proceeds to block 38, which illustrates hair image transformation section 14 transforming the portions of the selected hair image intended to overlap regions of the facial image and processing the portions of the selected hair image that does not overlap with the face region of the facial image. Finally, at block 40, the corrected hair image is superimposed on the facial image by the graphic subsystem 24 and the superposed image is displayed within display device 26. The process summarized in FIG. 2 will be described in greater detail below.

Photographing Facial Images and Extracting Facial Information

Facial images obtained with camera 2, which may be still images, are converted into a format suitable for handling by processing unit 10. Because the results achieved utilizing various types of facial image formats are usually similar to those resulting from still images, the image formats will not be further described here. For best results, the facial image is taken from the front with the user's hair up in order to expose the user's forehead and to prevent hair from obscuring the user's face.

Figure 3:
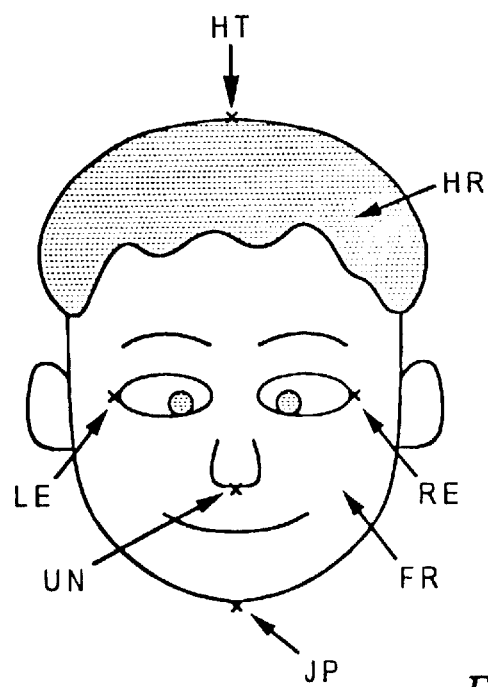
FIG. 3 illustrates points within a facial image which comprise facial information in a preferred embodiment of the present invention.

With reference now to FIG. 3, there is illustrated a diagram of facial features utilized to ascertain facial information. As shown in FIG. 3, facial information extracted from a facial image includes both eye tails (point LE and point RE), the underpart of a nose (point UN), the head top (point HT), the jaw (point JP), the face region (area FR), and the head region (area HR). These positions and regional information are automatically extracted by image processing by facial information extraction device 4. Because the positions and regional information are the same as those ordinarily used by hair simulation systems and do not constitute a central feature of the present invention, the positions and regional information will not be described further.

Selection of a Hair Style to be Simulated

Figure 4:
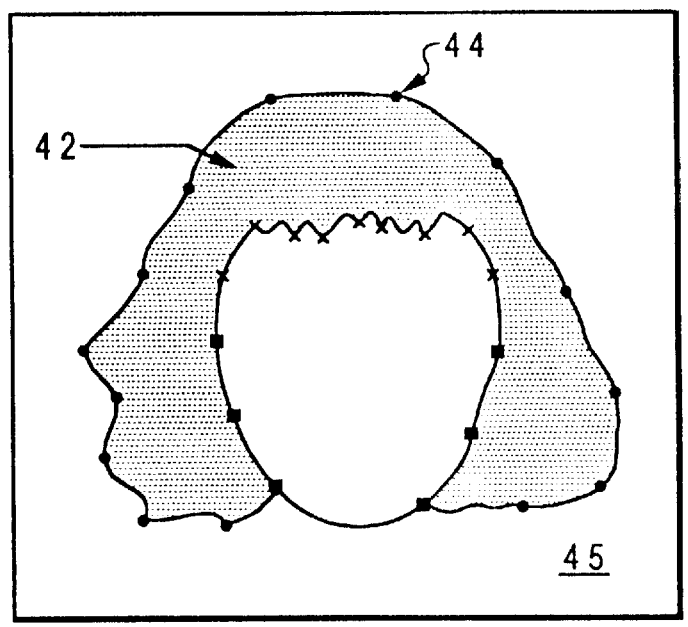
FIG. 4 depicts feature points within a hair image.

Prior to selecting hair images, hair images must be stored in the hair information storage 8. As with facial images, these hair images are photographed utilizing camera 2. As shown in FIG. 4, however, it is necessary to cut out the hair region 42 and to paint the background 45 wholly in a contrasting color (blue in a preferred embodiment). In addition, it is necessary to photograph the hair image from the front.

To facilitate subsequent processing, hair information is also prestored. This hair information is expressed as a combination of positional data of feature points 44 and their attributes. Feature points 44 are disposed on the outline of hair region 42 of a hair image at points of greatly changing curvature and may be relatively few in number in order to reduce the computation required to simulate a hair style. The shortcomings attributable to the disposition of the feature points are corrected by later processing steps.

The attribute associated with a feature point 44 signifies that the feature point 44 is either a point on the edge of the face region that should not overlap with the facial region of a facial image (an E point illustrated as a square), a point that can overlap with the face region of a face image (an F point illustrated as with an X), or an O point (illustrated as •) on the exterior of hair region 42 that does not border the facial region of a facial image. These location attributes are assigned predetermined values for use in later processing.

Furthermore, facial information includes corresponding feature points on the original face of a facial image. By reference to these feature points, a later correction of the size, slant, and position of the selected hair image is performed.

By retrieving hair images from hair information storage 8 and presenting them to a user, a user is enabled to select a particular hair image to simulate. Hair images may be displayed in a window format or simply in a screen divided into display areas. Alternatively, the display may be arranged to list names of hair images, display only names of hair images, or display a selected hair image alone within display device 26. In response to a user's selection of one of the displayed hair images, subsequent processing is initiated.

Correction of Hair Images

Figure 5:
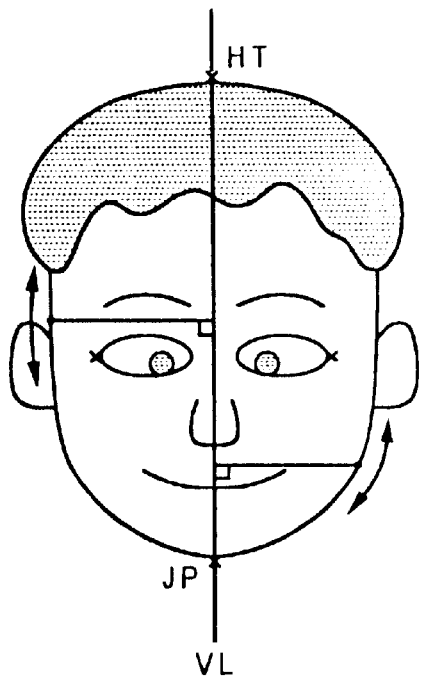
FIG. 5 illustrates the method utilized by the present invention to compute facial width.

A. Correcting the Size:

First, the width WF of a face in a facial image and the width WH of hair in a hair image are evaluated. The facial width is evaluated by calculating the respective distance from each point on the outline of a face to the line VL connecting the head top point HT and the jaw JP, as shown in FIG. 5, and determining the maximum values in the right half and left half of the facial image. The sum of both maximum values is the width of the face. If the size of a hair image is corrected, it is advisable to compute a value of WF/WH and enlarge the length and width of a hair image by WF/WH. However, if the size of a face image is corrected, it is advisable to compute a value of WH/WF and enlarge the length and width of a face image by WH/WF. In the described embodiment, only the hair image is corrected.

B. Correcting the Slant

Figure 6:
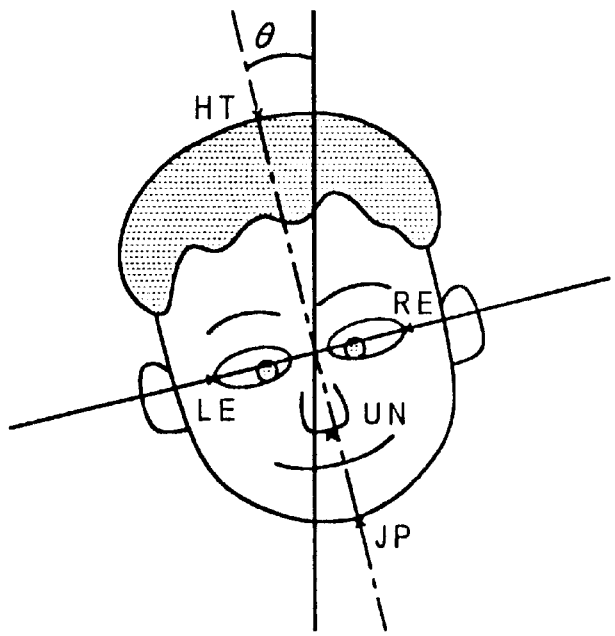
FIG. 6 depicts the method utilized by the present invention to correct the slant of a hair image.

Next, a slant angle of the head $\Theta$ (rotation angle around an axis perpendicular to the image) of the facial image and hair image is determined. As shown in FIG. 6, this angle is evaluated from the slant of a line connecting both eye tails LE and RE ($\Theta=0$ along the vertical axis connecting HT and JP). To correct the slant, either the hair image or the facial image is rotated by the difference angle $\Theta$.

C. Correcting the Position

Figure 7:
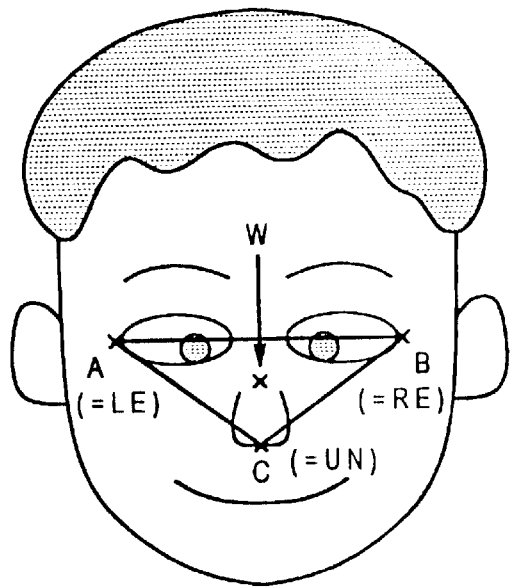
FIG. 7 illustrates the method utilized by the present invention to correct the position of a hair image.

First, a reference point W for positional correction is determined. As shown in FIG. 7, this reference point W is the center of gravity of a triangle ABC connecting eye tails LE and RE and the point UN directly below the nose. As is described below, the hair image is translated based upon a positional difference between points within the hair image and W. However, a face image may alternatively be translated.

When a hair image corrected in size, slant, and position is simply pasted onto a facial image, a gap is often apparent around the face or neck, or hair overhangs a portion of the cheek too much. To eliminate these problems, the hair image is transformed by the following method to fit with the facial image.

The image morphing transformation is performed by transforming a pixel with respect to transformed reference vectors disposed on the image. That is, a pixel in the hair region of a hair image is drawn by substituting a pixel value computed by reference to the transformation of a reference vector for the original pixel value of the point.

Figures 8A, 8B:
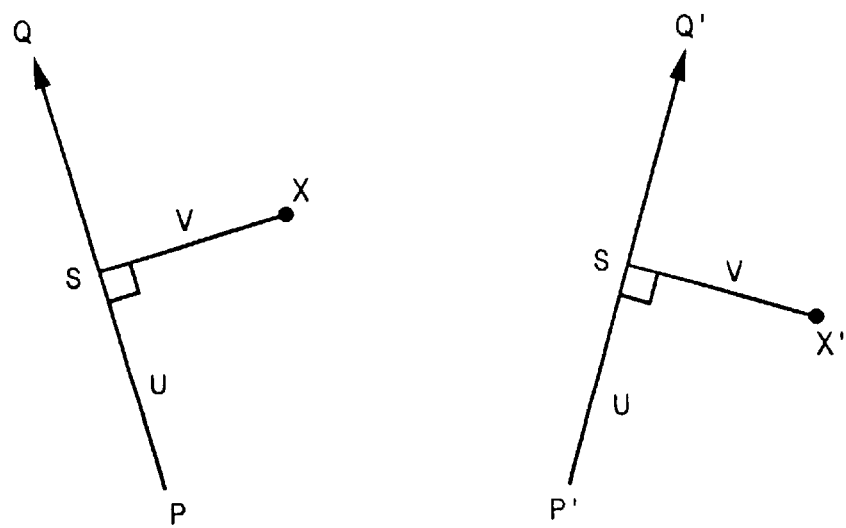
FIGS. 8A and 8B depict the transformation of an image pixel with respect to a single reference vector according to the present invention.

Specifically, the image morphing transformation for a pixel with respect to a single reference vector is accomplished as illustrated in FIGS. 8A and 8B. As depicted FIG. 8A, the positional relation between the pixel X and a reference vector PQ is represented with a pair of variables (U, V). U is expressed as a ratio of the distance between the intersection point S of the perpendicular dropped from X to PQ and P, relative to the size of PQ. Thus, a value of U ranges from 0 to 1 as S moves from P to Q. V is also expressed as a ratio between the length of the perpendicular from X to PQ and the length of PQ.

Referring now to FIG. 8B, there is depicted a transformation of pixel X to pixel X'. As depicted, pixel X, represented by transformation variables (U, V) as is shown in FIG. 8A, is transformed to pixel X', which satisfies the positional relation of (U, V) relative to the transformed reference vector P'Q'. By substituting a pixel value of X' for the pixel value of X, the transformation is complete.

Figure 9A:
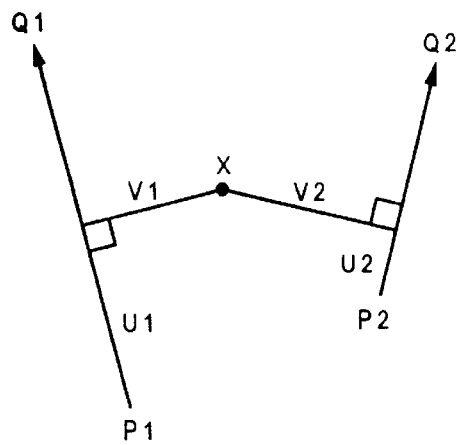
FIGS. 9A and 9B illustrate the transformation of an image pixel with respect to a plurality of reference vectors according to the present invention.
Figure 9B:
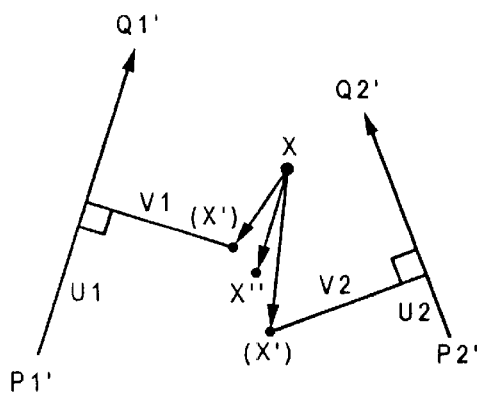

With reference now to FIGS. 9A and 9B, there is illustrated a pictorial representation of the transformation of a pixel X with respect to a plurality of reference vectors. When there are a plurality of reference vectors, the dependency of each pixel on individual reference vectors $P_iQ_i$ is computed and the transformed pixel is translated in accordance with each dependency. That is, as shown in FIG. 9A, the positional relationship of reference vectors $P_1Q_1$ and $P_2Q_2$ with respect to pixel X is given by (U1, V1) and (U2, V2), respectively. However, application of these relationships to the transformed reference vectors often does not result in a single point X'as shown in FIG. 9B. Thus, a point X' is computed for each individual reference vector. Thereafter, as shown in FIG. 9B, a single pixel X" is computed from the points X' obtained from each reference vector $P_iQ_i$ on the basis of the distance between pixel X and the transformed and reference vectors so that a reference vector closer to pixel X affects the transformation more.

Figure 11:
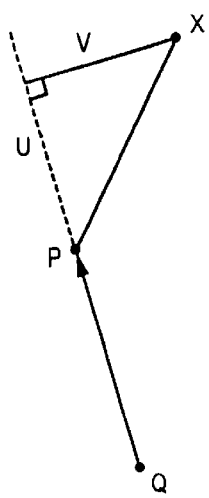
FIG. 11 illustrates the computation of the distance between a reference vector and a pixel outside of the extent of the reference vector according to the present invention.
Figure 10:
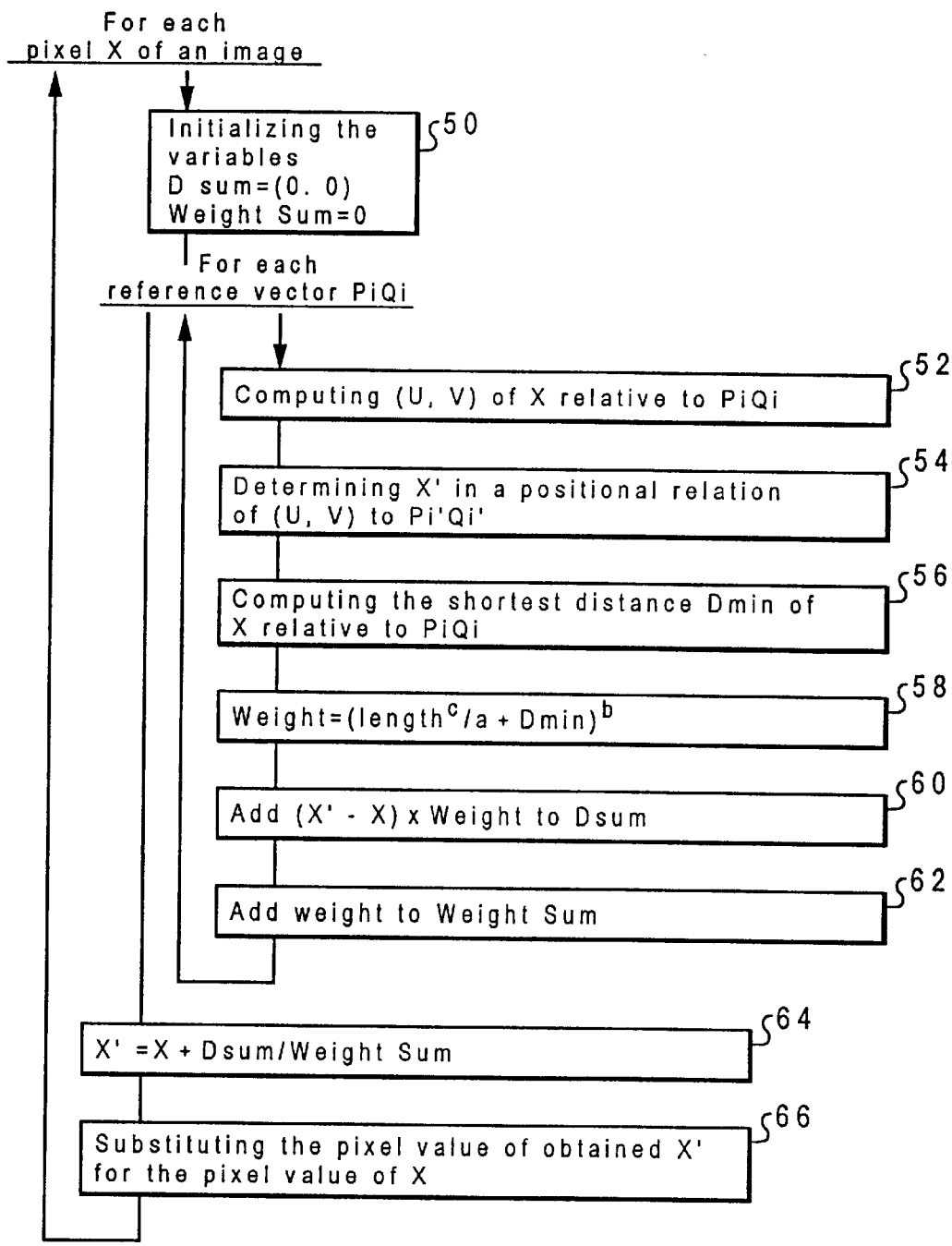
FIG. 10 is a flowchart of the process utilized by a preferred embodiment of the present invention to transform pixels within an image with respect to a plurality of reference vectors.

Referring now to FIG. 10, there is depicted the procedure for transforming each pixel in an image with respect to a plurality of reference vectors. First, the variables for a particular pixel are initialized to 0 as illustrated at block 50. Next, as depicted at block 52, the transformation variables (U, V) are computed for every reference vector. The process then proceeds to block 54, which illustrates determining the position of X' by applying (U, V) to the corresponding reference vector $P_i'Q_i'$. The process proceeds from block 54 to block 56, which depicts computing the shortest distance ($D_{min}$) from X to $P_iQ_i$. Point X usually lies within the range of vector PQ as shown in FIG. 8A. However, when X lies outside the range of vector PQ as shown in FIG. 11, it should be noted that XP becomes the shortest distance determined at block 56.

Next, a weighting value is computed at block 58 by the formula: weight=$(length^c/a+D_{min})^b$, where length means the length of reference vector $P_iQ_i$, $D_{min}$ signifies the shortest distance from X to $P_iQ_i$, and a, b, c are appropriate constants. Although this formula may be utilized, a preferred embodiment of the present invention simply assigns a preset weight to each reference vector instead of using the c-th power of the length. The preset weights are set by reference to attributes assigned to feature points forming the base of the reference vector. That is, if the attribute of a feature point is an E point, the feature point is HEAVY. If the attribute is F, the feature point is HEAVY if the feature point is translated or else LIGHT. If the attribute is O, the feature point is LIGHT. More particularly, weights are set to 4.0 for HEAVY and 1.0 for LIGHT, while "a" and "b" are set to 0.5 and 2.0, respectively.

Weights determined at block 58 are then utilized to calculate accumulated values at blocks 60 and 62. After each reference vector is processed, X is transformed utilizing the saved weights to determine an appropriate X' (block 64) and the pixel value of X' is substituted for the pixel value of X (block 66).

1. Translation of Feature Points

The deformation operation of a hair image determines how the hair image and facial image overlap with each other and translates feature points of the hair image to fit with the facial image. Tests of overlap are as follows:

Because they do not overlap the face, the feature points having attribute O (not contacting the face region) are not tested.

When a feature point Pf having an attribute F is situated outside of the face region FR of the facial image as shown in FIG. 12, the intersection point Pf between the face region and the line connecting the point Pf with the reference point W of the face is determined. Pf is then translated to Pf'. However, if the point Pf is situated within the face region, no translation is performed.

With respect to the feature point Pe having attribute E, as shown in FIG. 12, a line is drawn through point Pe in parallel with the line connecting eye tails RE and LE. The intersection point Pe' of this line with the facial region is then determined to translate point Pe to the point Pe'. That is, point Pe is translated such that Pe' is situated on the border of the face region.

2. Generation of Reference Vector

Utilizing the methodology described above, the feature points having attributes E and F are individually translated, thereby generating feature points of each type on the outline of the hair image and the facial image. Thus, for each of feature point attributes E and F, reference vectors are constructed for the hair image and the facial image by connecting adjacent feature points having the same attribute.

3. Image Morphing Transformation

Relative to reference vectors generated in this way, the image morphing transformation described above is performed. However, prior to translation, the adaptive division described below is performed relative to a reference vector related to the E feature point attribute.

4. Adaptive Division of Reference Vectors

The computation required by an image morphing transformation depends to a large extent upon the size of an image and the number of reference vectors. In fitting a hair image to a facial image, the utilization of a larger number of reference vectors improves the positional alignment of the hair image and results in a smoother synthesis. However, an increase in the amount of computation required to perform the simulation defeats one of the purposes of the present invention—to decrease the simulation processing time. Thus, as mentioned above, the selected feature points are not closely spaced.

However, if a reference vector connecting the feature points P and Q is constructed as shown in FIG. 13A, the region L is formed between the reference vector PQ and the outline of the face region. Although the attribute of feature points P and Q is E, region L is a portion of the simulated image in which the hair region and the face region overlap each other. Consequently, a new feature point should be added between feature points P and Q. Under these circumstances, an adaptive division of the reference vector is performed.

With reference now to FIG. 13B, there is illustrated an example of an adaptive division of a reference vector to determine a new feature point. This adaptive division is performed when the value of overlap error of a facial image (i.e., the largest distance between the outline of the face region and the reference vector) computed after the generation of a reference vector exceeds a predetermined value, and is continued until the value of the overlap error becomes lower than a predetermined value. The adaptive division is accomplished by establishing a new feature point S' at a point on the outline of the hair region nearest to the midpoint of the reference vector P'Q' and translating S' onto the outline of the face region. Reference vectors are then created as described above. If the overlap error becomes less than the predetermined value, an image morphing transformation is then performed.

Synthesis and Display of Hair Images and Face Images

In overlapping a hair image and facial image, processing using an a buffer is performed to prevent aliasing. The procedure is as follows:

1. The portion of the hair region HR within the facial image is deleted and filled with the background color. This prevents the hair region of the facial image from protruding from beneath the synthesized hair image.

2. The portions other than the background pixels (here, blue pixels) are extracted as the hair region from a deformed hair image (i.e., chrome-key processing). The values stored within the a buffer after extracting the hair image are a 1 (opaque) for a portion of hair and 0 (transparent) for other portions.

3. A smoothing filter is then applied on an a value of the edge portion of the hair region. A smoothing filter, such as a 5×5 Gaussian filter, is contemplated, but other appropriate filters can also be implemented.

4. Using a value of the a buffer, a-blend the hair image and the facial image.

5. Display the a-blended images on display device 28 of FIG. 1.

By implementing the foregoing steps, the simulation of a hair style is accomplished; however, the present invention is not limited to the embodiment described above. For example, the above description states that a face image is photographed prior to the selection of a hair image, but performing these steps in inverse sequence poses no problem. The points which may be selected as facial information are not limited to the particular points utilized in the described embodiment, and other points may be specified, if appropriate. Furthermore, the formulas and constants utilized to compute the weights in the image morphing transformation of a point with respect to a plurality of reference vectors can be replaced with other weights and constants if appropriate. In addition, the basis for performing an adaptive division was the maximum distance between the reference vector and the facial region boundary, but may be established by the area circumscribed by the reference vector and the boundary of the facial region.

While the invention has been particularly shown and described with reference to a preferred embodiment, it will be understood by those skilled in the art that various changes in form and detail may be made therein without departing from the spirit and scope of the invention.

What is claimed is:

1. A method within a image processing system for simulating a selected hair style, said image processing system including a display apparatus and storage media for storing one or more hair images, said method comprising the steps of:

providing a facial image, wherein said facial image includes a facial region bounded by a facial perimeter;

selecting one of said one or more hair images within said storage media to be simulated in association with said facial image, wherein said selected hair image includes an interior perimeter to be positioned adjacent to said facial image, said interior perimeter of said selected hair image including a first plurality of feature points distributed along said interior perimeter of said hair image, wherein a subset of said first plurality of feature points are disposed at locations at which said hair image is intended to abut, but not substantially overlap said facial image;

determining a second plurality of feature points within said facial perimeter and distributed along said facial perimeter, wherein each of said second plurality of feature points corresponds to a respective one of said subset of said first plurality of feature points distributed along said interior perimeter of said hair image;

constructing one or more facial perimeter vectors by connecting neighboring feature points among said second plurality of feature points distributed along said facial perimeter;

constructing one or more hair perimeter vectors by connecting neighboring feature points within said subset of said first plurality of feature points distributed along said interior perimeter of said hair image;

automatically transforming said hair image by displaying each of a plurality of pixels within said hair image at a transformed location, wherein a transformed location of each of said plurality of pixels within said hair image has a position with respect to said one or more facial perimeter vectors determined from an original position of said pixel with respect to said one or more hair perimeter vectors; and in response to said transformation of said hair image, displaying said transformed hair image superimposed on said facial image within said display apparatus, wherein hair style simulation efficiency is enhanced.

2. The method for simulating a selected hair style of claim 1, wherein said first plurality of feature points further includes a second subset of feature points at locations at which said hair image is intended to overlap said facial image, said method further comprising:

in response to an existence of a gap between said hair image and said facial image at locations at which said hair image is intended to overlap said facial image, determining a third plurality of feature points within said facial perimeter and distributed along said facial perimeter, wherein each of said third plurality of feature points corresponds to a respective one of said second subset of said first plurality of feature points distributed along said interior perimeter of said hair image;

constructing one or more secondary facial perimeter vectors by connecting neighboring feature points among said third plurality of feature points distributed along said facial perimeter;

constructing one or more secondary hair perimeter vectors by connecting neighboring feature points within said second subset of said plurality of feature points distributed along said interior perimeter of said hair image;

automatically transforming said hair image by displaying each of a plurality of pixels within said hair image at a transformed location, wherein a transformed location of each of said plurality of pixels within said hair image has a position with respect to said one or more secondary facial perimeter vectors determined from an original position of said pixel with respect to said one or more secondary hair perimeter vectors; and in response to said transformation of said hair image, displaying said transformed hair image superimposed on said facial image within said display apparatus.

3. The method for simulating a selected hair style of claim 2, wherein said step of determining a third plurality of feature points distributed along said facial perimeter comprises translating feature points within said second subset from said hair image to said facial perimeter by reference to a reference point within said facial image.

4. The method for simulating a selected hair style of claim 1, and further comprising the steps of:

following the construction of said one or more facial perimeter vectors, determining whether a maximum distance in an orthogonal direction from a particular facial perimeter vector to a corresponding portion of said facial perimeter bounded by neighboring feature points utilized to construct said particular facial perimeter vector exceeds a predetermined value;

in response to a determination that said maximum distance exceeds said predetermined value, establishing a new feature point on said facial perimeter between said neighboring feature points and a corresponding new feature point on said interior perimeter of said hair image; and repeating said steps of determining whether a distance exceeds a predetermined value and establishing a new feature point for each of said one or more facial perimeter vectors.

5. The method for simulating a selected hair style of claim 1, wherein said step of transforming said hair image comprises the steps of:

for each of said plurality of pixels within said hair image, computing an intermediate transformed location with respect to each of said one or more hair perimeter vectors, wherein said intermediate transformed location has an identical position with respect to an associated facial perimeter vector as a position of a pixel of said hair image with respect to a hair perimeter vector corresponding to said associated facial perimeter vector; and computing from said one or more intermediate transformed locations a single transformed location for each of said plurality of pixels within said hair image, wherein each of said intermediate transformed locations is assigned a weighting factor in said computation.

6. The method for simulating a selected hair style of claim 5, wherein said weighting factor for each of said one or more intermediate transformed locations depends upon a distance between said pixel of said hair image and said hair perimeter vector corresponding to said associated facial perimeter vector.

7. The method for simulating a selected hair style of claim 1, said facial image including two eyes, wherein said step of determining a second plurality of feature points distributed along said facial perimeter comprises translating feature points within said subset from said hair image to said facial perimeter by reference to a reference line intersecting both eyes of said facial image.

8. The method of claim 1, and further comprising the step of automatically correcting a size and orientation of said selected hair image with respect to said facial image.

9. An image processing system for simulating a selected hair style, said; image processing system including a display apparatus and storage media for storing one or more hair images, said image processing system comprising:

means for providing a facial image, wherein said facial image includes a facial region bounded by a facial perimeter;

means for selecting one of said one or more hair images within said storage media to be simulated in association with said facial image, wherein said selected hair image includes an interior perimeter to be positioned adjacent to said facial image, said interior perimeter of said selected hair image including a first plurality of feature points distributed along said interior perimeter of said hair image, wherein a subset of said first plurality of feature points are disposed at locations at which said hair image is intended to abut, but not substantially overlap said facial image;

means for determining a second plurality of feature points within said facial perimeter and distributed along said facial perimeter, wherein each of said second plurality of feature points corresponds to a respective one of said subset of said first plurality of feature points distributed along said interior perimeter of said hair image;

means for constructing one or more facial perimeter vectors by connecting neighboring feature points among said second plurality of feature points distributed along said facial perimeter;

means for constructing one or more hair perimeter vectors by connecting neighboring feature points within said subset of said first plurality of feature points distributed along said interior perimeter of said hair image;

means for automatically transforming said hair image by displaying each of a plurality of pixels within said hair image at a transformed location, wherein a transformed location of each of said plurality of pixels within said hair image has a position with respect to said one or more facial perimeter vectors determined from an original position of said pixel with respect to said one or more hair perimeter vectors; and means, responsive to said transformation of said hair image, for displaying said transformed hair image superimposed on said facial image within said display apparatus, wherein hair style simulation efficiency is enhanced.

10. The image processing system of claim 9, wherein said first plurality of feature points further includes a second subset of feature points at locations at which said hair image is intended to overlap said facial image, said image processing system further comprising:

means, responsive to an existence of a gap between said hair image and said facial image at locations at which said hair image is intended to overlap said facial image, for determining a third plurality of feature points within said facial perimeter and distributed along said facial perimeter, wherein each of said third plurality of feature points corresponds to a respective one of said second subset of said first plurality of feature points distributed along said interior perimeter of said hair image;

means for constructing one or more secondary facial perimeter vectors by connecting neighboring feature points among said third plurality of feature points distributed along said facial perimeter;

means for constructing one or more secondary hair perimeter vectors by connecting neighboring feature points within said second subset of said plurality of feature points distributed along said interior perimeter of said hair image;

means for automatically transforming said hair image by displaying each of a plurality of pixels within said hair image at a transformed location, wherein a transformed location of each of said plurality of pixels within said hair image has a position with respect to said one or more secondary facial perimeter vectors determined from an original position of said pixel with respect to said one or more secondary hair perimeter vectors; and means, responsive to said transformation of said hair image, for displaying said transformed hair image superimposed on said facial image within said display apparatus.

11. The image processing system of claim 10, wherein said means for determining a third plurality of feature points distributed along said facial perimeter comprises means for translating feature points within said second subset from said hair image to said facial perimeter by reference to a reference point within said facial image.

12. The image processing system of claim 9, and further comprising:

means, following the construction of said one or more facial perimeter vectors, for determining whether a maximum distance in an orthogonal direction from a particular facial perimeter vector to a corresponding portion of said facial perimeter bounded by neighboring feature points utilized to construct said particular facial perimeter vector exceeds a predetermined value;

means, responsive to a determination that said maximum distance exceeds said predetermined value, for establishing a new feature point on said facial perimeter between said neighboring feature points and a corresponding new feature point on said interior perimeter of said hair image.

13. The image processing system of claim 9, wherein said means for transforming said hair image comprises:

means for computing, for each of said plurality of pixels within said hair image, an intermediate transformed location with respect to each of said one or more hair perimeter vectors, wherein said intermediate transformed location has an identical position with respect to an associated facial perimeter vector as a position of a pixel of said hair image with respect to a hair perimeter vector corresponding to said associated facial perimeter vector; and means for computing from said one or more intermediate transformed locations a single transformed location for each of said plurality of pixels within said hair image, wherein each of said intermediate transformed locations is assigned a weighting factor in said computation.

14. The image processing system of claim 13, wherein said weighting factor for each of said one or more intermediate transformed locations depends upon a distance between said pixel of said hair image and said hair perimeter vector corresponding to said associated facial perimeter vector.

15. The image processing system of claim 9, said facial image including two eyes, wherein said means for determining a second plurality of feature points distributed along said facial perimeter comprises means for translating feature points within said subset from said hair image to said facial perimeter by reference to a reference line intersecting both eyes of said facial image.

16. The image processing system of claim 9, and further comprising means for automatically correcting a size and orientation of said selected hair image with respect to said facial image.

17. A computer program product within a computer readable media for causing an image processing system to simulate a selected hair style, said image processing system including a display apparatus and storage media for storing one or more hair images, said computer program product comprising:

instruction means for causing said image processing system to provide a facial image, wherein said facial image includes a facial region bounded by a facial perimeter;

instruction means for causing said image processing system to select one of said one or more hair images within said storage media to be simulated in association with said facial image, wherein said selected hair image includes an interior perimeter to be positioned adjacent to said facial image, said interior perimeter of said selected hair image including a first plurality of feature points distributed along said interior perimeter of said hair image, wherein a subset of said first plurality of feature points are disposed at locations at which said hair image is intended to abut, but not substantially overlap said facial image;

instruction means for causing said image processing system to determine a second plurality of feature points within said facial perimeter and distributed along said facial perimeter, wherein each of said second plurality of feature points corresponds to a respective one of said subset of said first plurality of feature points distributed along said interior perimeter of said hair image;

instruction means for causing said image processing system to construct one or more facial perimeter vectors by connecting neighboring feature points among said second plurality of feature points distributed along said facial perimeter;

instruction means for causing said image processing system to construct one or more hair perimeter vectors by connecting neighboring feature points within said subset of said first plurality of feature points distributed along said interior perimeter of said hair image;

instruction means for causing said image processing system to automatically transform said hair image by displaying each of a plurality of pixels within said hair image at a transformed location, wherein a transformed location of each of said plurality of pixels within said hair image has a position with respect to said one or more facial perimeter vectors determined from an original position of said pixel with respect to said one or more hair perimeter vectors; and instruction means, responsive to said transformation of said hair image, for causing said image processing system to display said transformed hair image superimposed on said facial image within said display apparatus, wherein hair style simulation efficiency is enhanced.

18. The computer program product of claim 17, wherein said first plurality of feature points further includes a second subset of feature points at locations at which said hair image is intended to overlap said facial image, said computer program product further comprising:

responsive to an existence of a gap between said hair image and said facial image at locations at which said hair image is intended to overlap said facial image, instruction means for causing said image processing system to determine a third plurality of feature points within said facial perimeter and distributed along said facial perimeter, wherein each of said third plurality of feature points corresponds to a respective one of said second subset of said first plurality of feature points distributed along said interior perimeter of said hair image;

instruction means for causing said image processing system to construct one or more secondary facial perimeter vectors by connecting neighboring feature points among said third plurality of feature points distributed along said facial perimeter;

instruction means for causing said image processing system to construct one or more secondary hair perimeter vectors by connecting neighboring feature points within said second subset of said plurality of feature points distributed along said interior perimeter of said hair image;

instruction means for causing said image processing system to automatically transform said hair image by displaying each of a plurality of pixels within said hair image at a transformed location, wherein a transformed location of each of said plurality of pixels within said hair image has a position with respect to said one or more secondary facial perimeter vectors determined from an original position of said pixel with respect to said one or more secondary hair perimeter vectors; and instruction means, responsive to said transformation of said hair image, for causing said data processing system to displaying said transformed hair image superimposed on said facial image within said display apparatus.

19. The computer program product of claim 18, wherein said instruction means for causing said image processing system to determine a third plurality of feature points distributed along said facial perimeter comprises instruction means for causing said image processing system to translate feature points within said second subset from said hair image to said facial perimeter by reference to a reference point within said facial image.

20. The computer program product of claim 17, and further comprising:

instruction means for causing said image processing system to determine whether a maximum distance in an orthogonal direction from a particular facial perimeter vector to a corresponding portion of said facial perimeter bounded by neighboring feature points utilized to construct said particular facial perimeter vector exceeds a predetermined value following construction of said one or more facial perimeter vectors;

instruction means, responsive to a determination that said maximum distance exceeds said predetermined value, for causing said image processing system to establish a new feature point on said facial perimeter between said neighboring feature points and a corresponding new feature point on said interior perimeter of said hair image; and instruction means for causing said image processing system to repeat said steps of determining whether a distance exceeds a predetermined value and establishing a new feature point for each of said one or more facial perimeter vectors.

21. The computer program product of claim 17, wherein said instruction means for causing said image processing system to transform said hair image comprises:

instruction means for causing said image processing system to compute, for each of said plurality of pixels within said hair image, an intermediate transformed location with respect to each of said one or more hair perimeter vectors, wherein said intermediate transformed location has an identical position with respect to an associated facial perimeter vector as a position of a pixel of said hair image with respect to a hair perimeter vector corresponding to said associated facial perimeter vector; and instruction means for causing said image processing system to compute from said one or more intermediate transformed locations a single transformed location for each of said plurality of pixels within said hair image, wherein each of said intermediate transformed locations is assigned a weighting factor in said computation.

22. The computer program product of claim 21, wherein said weighting factor for each of said one or more intermediate transformed locations depends upon a distance between said pixel of said hair image and said hair perimeter vector corresponding to said associated facial perimeter vector.

23. The computer program product of claim 17, said facial image including two eyes, wherein said instruction means for causing said image processing system to determine a second plurality of feature points distributed along said facial perimeter comprises instruction means for causing said image processing system to translate feature points within said subset from said hair image to said facial perimeter by reference to a reference line intersecting both eyes of said facial image.

24. The computer program product of claim 15, and further comprising instruction means for causing said image processing system to automatically correct a size and orientation of said selected hair image with respect to said facial image.

\* \* \* \* \*

UNITED STATES PATENT AND TRADEMARK OFFICE
CERTIFICATE OF CORRECTION

PATENT NO.   : 6,453,052 B1
DATED        : September 17, 2002
INVENTOR(S)  : Kurokawa et al.

It is certified that error appears in the above-identified patent and that said Letters Patent is hereby corrected as shown below:

Column 2,
Lines 3 through 5, please delete and replace with -- It is yet another object of the present invention to provide an easily operable hair style simulation system which automatically fits an image of a hair style to a facial image. --

Column 10,
Line 51, please delete "said;" and replace with -- said --.

Signed and Sealed this

Third Day of June, 2003

JAMES E. ROGAN
*Director of the United States Patent and Trademark Office*